3,823,106
METHOD FOR PREPARING WATER-SOLUBLE OR DISPERSIBLE COATING COMPOSITION AND METHOD FOR CONTROLLING COATING BATH CONTAINING THE SAME
Tadasu Kimura and Takashi Sunamori, Ohtake, and Sadao Kimura, Hiroshima, Japan, assignors to Mitsubishi Rayon Co., Ltd., Tokyo, Japan
No Drawing. Filed Dec. 27, 1971, Ser. No. 212,711
Claims priority, application Japan, Dec. 25, 1970, 45/129,321
Int. Cl. C08f 15/40
U.S. Cl. 260—29.4 UA                    20 Claims

ABSTRACT OF THE DISCLOSURE

A method which comprises treating with an anion exchanger a paint binder composed mainly of a polycarboxylic acid resin having an average $pKa(r)$ value of 8.0 or more and $0.8 \leq n \leq 2.5$, or a salt thereof to make 5% or less the content of impurities in the binder, said impurities being composed mainly of (i) polycarboxylic acid resins having a $pKa(r)$ value at least 5.0 smaller than the $pKa(r)$ value of the main polycarboxylic acid resin constituting the binder, or salts thereof and (ii) low molecular weight acids having a $pKa(e)$ value at least 0.5 smaller than the $pKa(r)$ value of the main polycarboxylic acid resin, or salts thereof, adding to the thus treated paint binder 60% or less of water or neutralizing agent-containing water, treating the resulting mixture with a cation exchanger to obtain a coating composition, diluting the coating composition with deionized water to a solid content of 20% by weight or less to form an aqueous coating bath and effecting electrodeposition coating in said bath while replenishing the bath with said coating composition corresponding to the nonvolatile matter taken out of the bath by coating, without accumulating the neutralizing agent in the bath.

This invention relates to a method for preparing a water-soluble or dispersible coating composition and a method for replenishing an aqueous coating bath formed of said coating composition with a fresh coating composition corresponding to the progress of coating.

Many aqueous coating compositions containing, as the main component, a water-soluble or dispersible polycarboxylic acid resin, have been known and used widely in the field of coating compositions for dipping or electrodeposition. Recently, the progress of polymerization technique has resulted in the development of polycarboxylic acid resins suitable for one-coat finish by an electrodeposition coating method. Since the dispersion stability of the polycarboxylic acid resin in an aqueous meidum is not sufficient and a neutralizing agent for the polycarboxylic acid resin is accumulated in an aqueous coating bath containing the resin as the coating proceeds, the coating film formed on a substrate by coating it in said coating bath tends to be inferior in properties, such as gloss, corrosion-resistance, weather-resistance and the like.

Various methods for removing the disadvantages have been proposed which are caused in such an aqueous coating bath, particularly an electrodeposition coating bath. For example, Dutch Patent Application No. 6815277 discloses an improvement of the characteristics of the polycarboxylic acid resin to remove the above-mentioned disadvantages. British Pat. No. 972,169 discloses using, as a replenishing paint, a polycarboxylic acid resin having a lower degree of neutralization than that of the polycarboxylic acid resin salt used for preparing the coating bath in order to neutralize the excessive neutralizing agent accumulated in the coating bath. French Patent No. 1,431,389 teaches providing anodes separated by a diaphragm in a coating bath and taking the amine gathered in the neighbourhood of the anodes out of the bath, thereby preventing the excessive neutralizing agent amine from being accumulated in the coating bath. Further, French Pat. No. 1,439,867 and British Pat. No. 1,030,204 disclose providing an electrical dialyzer in a coating bath, by which the excessive amine accumulated in the coating bath is taken out of the bath, and British Pat. No. 1,033,833 discloses treating a coating bath with a cation exchange resin to remove the excess of amine present in the bath. Moreover, in the Paint Oil and Colour Journal, Aug. 14, 1970, page 24, it is described that the coating bath is filtered through a membrane filter to discharge the excessive amine from the bath.

These methods, however, require measuring always the amount of the neutralizing agent present in the coating bath, and hence, require complicated operations therefor. In addition, these methods require an apparatus for taking the neutralizing agent accumulated in the coating bath out of the bath, and hence, are disadvantageous in economy. Furthermore, the amount of the neutralizing agent present in the coating bath is always varied, whereby the solubility of the polycarboxylic acid resin in the coating bath is also varied, and therefore, the characteristics of the coating film formed on a substrate by coating it with such a coating bath, particularly the gloss, corrosion-resistance and weather-resistance of the coating, are varied, and uniform coating films cannot continuously be obtained. Such a phenomenon becomes a very great bar to the one-coat finish method. At least the following two conditions are required to be satisfied for obtaining an aqueous coating composition holding no disadvantages mentioned above and obtaining coating films having excellent characteristics from this coating composition. The first is that the coating bath containing the polycarboxylic acid resin salt does not cause any change with the lapse of time, and the second is that the paint particles consisting essentially of a polycarboxylic acid resin contained in the aqueous coating bath do not cause any change with the lapse of time.

The present inventors have found that when coating is effected while replenishing a coating bath with a fresh coating composition corresponding to the amount of the coating composition taken out of the bath as the coating proceeds to maintain the amount of the nonvolatile matter present in the bath at $M_o$, the amount of the neutralizing agent present in the bath, A, and the amount of the neutralizing agent per the unit amount of the nonvolatile matter in the bath, $C_b$, can be shown by the following equations:

$$A = M_o(C_a - C_e)T + A_o \quad [C]$$

$$C_b = (C_a - C_e)T + C_b^o \quad [D]$$

wherein A refers to the amount of the neutralizing agent present in the aqueous coating bath containing a polycarboxylic acid resin salt at any time, $A_0$ to the amount of the neutralizing agent in the coating bath just before the beginning of coating, $M_0$ to the amount of the nonvolatile matter present in the coating bath at the beginning of coating, $C_a$ to the amount of the neutralizing agent per the unit amount of the nonvolatile matter in the replenishing coating composition, $C_e$ to the amount of the neutralizing agent per the unit amount of the nonvolatile matter in the coating composition taken out of the bath by coating, T to $m/M_0$ in which $m$ is the amount of the nonvolatile mater taken out of the bath by coating, the time at which $m$ becomes $M_0$ being called one turnover, $C_b$ to the amount of the neutralizing agent per the unit amount of the nonvolatile matter in the bath at any time, and $C_b^o$ to the amount of the neutralizing agent per the unit amount of the nonvolatile matter present in the coating bath just before the beginning of coating.

In the conventional coating method, an aqueous coating bath containing a polycarboxylic acid resin salt is used, and as coating proceeds, the bath is replenished with a coating composition containing a polycarboxylic acid resin salt corresponding to the amount of the nonvolatile matter taken out of the system. However, in the prior art method, the amount of the neutralizing agent per the unit amount of the nonvolatile matter in the coating composition taken out of the bath by coating is always smaller than that of the neutralizing agent per the unit amount of the nonvolatile matter in the coating composition present in the bath. That is, $C_b^o > C_e$. When such a phenomenon is caused, the solubility in water of the coating composition present in the bath is varied, and it is difficult to continuously form a standardized coating film by effecting coating in such a coating bath. In order to avoid this disadvantage, methods as in British Pat. Nos. 972,169 and 1,030,204 and French Pat. No. 1,439,867 have been proposed. These methods, however, are disadvantageous in economy, because they require a complicated operation for always checking the amount of the neutralizing agent present in the bath or require an expensive apparatus.

The present inventors have done extensive research on the production of a water-soluble or dispersible coating composition which does not bring about such disadvantages and on the controlling of an aqueous coating bath formed of said water-soluble or dispersible coating composition so as not to accumulate the neutralizing agent in the bath during the progress of coating, and consequently completed the present invention.

The present invention has four fundamental embodiments. The first embodiment is a method for preparing a water-soluble or dispersible, coating composition, by treating a paint binder with an anion exchanger, said paint binder being mainly composed of a polycarboxylic acid resin whose characteristic value pKa(r) define by the following equation [A] is 8.0 or more on the average and $0.8 \leq n \leq 2.5$ ($n$ is defined hereinafter), or a salt thereof to make 5% or less the content of impurities in the binder, said impurities being mainly composed of (i) polycarboxylic acid resins having a pKa(r) value at least 0.5 smaller than that of the main polycarboxylic acid resin constituting said paint binder, or salts thereof, and (ii) low molecular weight acids having a characteristic value pKa(e) defined by the following equation [B] at least 0.5 smaller than the pKa(r) value, or salts thereof:

$$pH = pKa(r) + n \log \frac{\alpha}{1-\alpha} \quad [A]$$

wherein pKa(r) is a constant represented by $-\log Ka(r)$ in which Ka(r) is the dissociation constant of the acid group of the polycarboxylic acid resin in water; $\alpha$ is the degree of neutralization of the polycarboxylic acid resin with a neutralizing agent (i.e., the ratio of the equivalent of the neutralizing agent used to that of the total acid groups of the resin) and $0.15 \leq \alpha \leq 0.80$; $n$ is a constant indicating the extension of the polycarboxylic acid resin in water, $$pH = pka(e) + \log \frac{\alpha}{1-\alpha} \quad [B]$$

wherein pKa(e) is a constant represented by $-\log Ka(e)$ in which Ka(e) is the dissociation constant of the low molecular weight acid in water; and $\alpha$ is the degree of neutralization of the low molecular weight acid with a neutralizing agent (the ratio of the equivalent of the neutralizing agent to that of the total acid groups of the acid).

The second embodiment is a method for preparing an aqueous coating composition which comprising adding 60% by weight or less of water to the paint binder obtained by the method of the first embodiment and then treating the resulting mixture with a cation exchanger, wherein the word "treating" means that the paint binder is contacted and reacted with the ion exchanger in the reaction vessel or pipe at temperatures within the usual temperature limit for the ion exchanger and is hereinafter used in the same meaning.

The third embodiment is a method for controlling a coating bath which comprises forming an aqueous coating bath by diluting the paint binder obtained by the method of the second embodiment and replenishing the coating bath with the paint binder obtained by the method of the second embodiment or its diluted product corresponding to the amount of the coating composition taken out of the bath with the progress of coating.

The fourth embodiment is a method for replenishing with a coating composition an electrodeposition coating bath containing a vinylic polymer containing carboxyl groups, alkoxyalkylamido groups and/or hydroxyalkyl groups as the polycarboxylic acid resin for forming a finished coating film on an object by one electrodeposition coating (referred to hereinafter as one-coat finish).

When a water-soluble or dispersible coating composition is prepared by use of the paint binder composed of a polycarboxylic acid resin salt and then dissolved or dispersed in water to form an aqueous coating bath, the characteristic of the said resin in this coating bath is defined by the equation [A]. The polycarboxylic acid resin used in the present invention is usually a mixture of polymers having different pKa values (i.e., the polycarboxylic acid resin has a considerably wide distribution of degree of polymerization and composition). Therefore, when said polycarboxylic acid resin is dissolved or dispersed in water, a uniform aqueous bath is temporarily formed. However, with the lapse of time, the polycarboxylic acid resin is precipitated from the bath. This is because materials having a pKa value smaller than that of the main polymer constituting the polycarboxylic acid resin, particularly at least 0.5 smaller than the pKa(r) value of the latter, said materials being mainly low molecular weight polymers having a high carboxylic acid content and unpolymerized materials included in the polycarboxylic acid resin, are more water-soluble than the main polycarboxylic acid polymer, and hence, the materials are dissolved into water from the coating composition particles in the aqueous bath to vary the dispersion equilibrium of the aqueous bath. In order to prepare resins which do not exhibit such disadvantages, the polycarboxylic acid resin is treated with an anion exchanger to make 5% or less the content of the impurities having a lower pKa value contained in the resin. Further, where the polycarboxylic acid polymer is a vinylic polymer, a small amount of water and/or vinyl monomer copolymerizable with the remaining unsaturated carboxylic acid is added to the polymerization system at the end of polymerization of the vinylic polycarboxylic acid, the polymerization is completed and the thus obtained polycarboxylic acid polymer is then treated with an anion exchanger.

The polycarboxylic acid resins which may be used in the present invention include alkyd resins, oil-free alkyd resins, polyvinyl carboxylate resins, carboxylic acid-modified epoxy resins, maleinized polybutadiene resins and the like. Particularly preferable are vinylic polymers for forming a film having excellent properties on an object by the one-coat finish according to an electrodeposition coating in an aqueous bath containing said resins.

The vinyl polymers which may be used in the present invention are those obtained by copolymerizing 5 to 80 mole percent of a vinyl monomer represented by the formula:

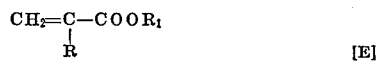

wherein R is hydrogen or methyl and $R_1$ is a $C_1$–$C_{18}$ straight chain or branched chain alkyl, 60 mole percent or less of a vinyl monomer represented by the formula:

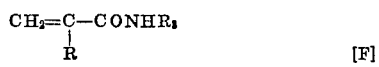

wherein R is the same as defined above, and $R_3$ is hydrogen or —$CHR_4OR_5$ in which $R_4$ and $R_5$ are hydrogen or $C_1$–$C_8$ straight chain, branched chain or cyclic alkyls, and/or a vinyl monomer represented by the formula:

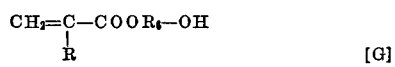

wherein R is the same as defined above and $R_6$ is a $C_1$–$C_8$ substituted or unsubstituted alkylene; 1 to 30 mole present of (H) an α,β-monoethylenically unsaturated mono- or di-carboxylic acid, its anhydride or its half alkyl ester; and 5 to 40 mole present of (I) at least one vinyl monomer copolymerizable with these vinyl monomers, the total amount of these monomers being 100 mole percent.

The vinyl monomers represented by the formula [E] are acrylates or methacrylates in which $R_1$ is an alkyl, for example, methyl, ethyl, n-propyl, iso-propyl, sec-butyl, t-butyl, pentyl, 2-ethylhexyl, nonyl, dodecyl, stearyl, or benzyl.

The vinyl monomers represented by the formula [F] are acrylamides or methacrylamides in which $R_3$ is

The alkoxy groups represented by OR include hydroxy, methoxy, ethoxy, n-propoxy, n-butoxy, pentoxy or cyclohexoxy, and the alkylene groups represented by

include methylene, ethylene, propylene, hexylene and 2-ethylhexylene.

The vinyl monomers represented by the formula [G] are monoesters of diols with acrylic or methacrylic acid, and as said diols, there may be used ethylene glycol, propylene glycol, 1,3-butylene glycol, 1,4-butane diol, hexylene glycol, 2-ethylhexylene glycol and the like.

The unsaturated carboxylic acids (H) are acrylic acid, methacrylic acid, itaconic acid, α-methylene glutaric acid, itaconic acid half ester and α-methylene glutaric acid half ester in which the half ester selected from methyl ester, ethyl ester, butyl ester, propyl ester, hexyl ester, octyl ester and the like. The copolymerizable vinyl monomers (I) may be any vinyl monomers as far as they are copolymerizable with the monomers (E) to (H). Examples of the monomer (I) are styrene, α-methylstyrene, vinyl chloride, vinyl acetate, vinyl propionate, vinyl esters of Versatic Acid, acrylamide, methacrylamide, acrylonitrile, methacrylonitrile and the like.

Among these monomers, the component (E) is required to be copolymerized in a proportion of 5 to 80 mole percent, and if it is present in a proportion of less than 5 mole percent in the copolymer, the coating film resulting from the copolymer is inferior in characteristics, particularly gloss, weather-resistance. On the other hand, if the component (E) is present in a proportion of more than 80 mole percent in the copolymer, the coating film resulting therefrom tends to have a decreased hardness, stain resistance, impact resistance and the like. Therefore, such copolymers are not desirable.

The carboxylic acid as the component (H) is required to make the resulting copolymer water-soluble or water-dispersible by neutralization. It is preferable to incorporate this component into the copolymer as a copolymer constituent in a proportion of 1 to 30 mole percent. When this component is copolymerized in a proportion of less than 1 mole percent, the resulting copolymer is inferior in affinity to water and hence cannot be used for the purpose of the present invention. On the other hand, when said component is copolymerized in a proportion of more than 30 mole percent, the affinity of the resulting copolymer to water becomes good, but the water-resistance and corrosion-resistance of the coating film formed from such copolymer are degraded. Therefore, the use of more than 30 mole percent of the component (H) is not desired. Thus, itaconic acid and α-methylene glutaric acid which are relatively hydrophobic and have excellent copolymerizability to obtain a sharp distribution of polymer composition among these acids show excellent effects in the present invention, particularly in the preparation of an aqueous coating composition having a one-coat finish adaptabiilty.

The components represented by the formulas (F) and (G) are for imparting heat-cross-linkability to the vinyl polymer, and are preferably present in the copolymer in a proportion of 60 mole percent or less, particularly 5 to 60 mole percent in total. In order to obtain an aqueous coating composition having excellent characteristics and a one-coat finish adaptability, 5 to 40 mole percent of the vinyl monomer represented by the formula (F) and 5 to 40 mole percent of the vinyl monomer represented by the formula (G) (5 to 60 mole percent in total) should preferably be copolymerized.

A film formed from the thus obtained copolymer is heated to be cross-linked, whereby the resulting film becomes excellent in gloss, weather-resistance, hardness and corrosion-resistance. In order to make good the properties of a film formed from an aqueous coating composition having a one-coat finish adaptability, it is necessary that the polycarboxylic acid resin which is the main constituent of the coating composition is as hydrophobic as possible. For satisfying this condition, the characteristic value pKa(r) which indicates the acidity of the polycarboxylic acid resin must be 8.0 or more and the degree of neutralization of the polycarboxylic acid resin with a base must be within the range of $0.15 \leq \alpha \leq 0.80$. A polycarboxylic acid resin having a pKa(r) value of less than 8.0 has too low a thermal flowability to form a film having excellent gloss. Further, this resin is hydrophilic, and hence, a film formed from this resin has low resistance to water, corrosion and alkali. When the α value of the polycarboxylic acid resin is less than 0.15, it becomes impossible to dissolve or disperse the resin in water. On the other hand, when the α value is more than 0.80, the water-solubility of the resin is too high and the thermal flowability of the resin is too low, whereby the water resistance and corrosion resistance of a film formed from the resin is lowered.

In this invention, the paint binder composed mainly of the polycarboxylic acid resin preferably doesn't contain an emulsifying agent. As the paint binder containing an emulsifying agent is hydrophilic, the coating films formed from the said paint binder have low water resistance, weather resistance, and resistance to alkali and corrosion.

When an aqueous coating bath is prepared from a polycarboxylic acid resin containing materials having a pKa value smaller than the pKa(r) value of the main constituent of the polycarboxylic acid resin, said materials migrate into water because they are more water-soluble than the polycarboxylic acid resin. Therefore, an aqueous coating bath formed from such a polycarboxylic acid resin liberates materials having a lower pKa value into water with the lapse of time to break the equilibrium of the aqueous coating bath, whereby paint particles consisting mainly of the polycarboxylic acid resin are precipitated. Such a disadvantage appears remarkably where the polycarboxylic acid resin contains more than 5% of materials having a pKa value at least 0.5 smaller than the pKa(r) value of the main constituent of the polycarboxylic acid resin.

In the present invention, therefore, it is necessary that the amount of the lower pKa materials contained in the polycarboxylic acid resin is 5% or less, preferably 1% or less. Almost all of the lower pKa materials contained in the polycarboxylic acid resin used in the present invention are low molecular weight polymers containing carboxylic acid groups remaining incompletely polymerized or unpolymerized unsaturated acids. A first method for rendering the content of such lower pKa materials small comprises treating the polycarboxylic acid resin or its salt with an anion exchanger. According to this method, the content of the lower pKa materials in the resin can be made 5% or less. The treatment with an anion exchanger in this method include treatments with zeolite, alumina, silica, activated carbon, diatomaceous earth, an ion exchange resin, an ion exchange membrane and the like and the application of a dialysis or electrical dialysis, and the treatment with an anion exchange resin, particularly having a particle size of 1,200 microns or less, can exhibit the most excellent effect. When the particle size is more than 1,200 microns, the ability to treat the polycarboxylic acid resin is lowered. As the salt type of anion exchange resin, there may be used $SO_4^{--}$, $Cl^-$, $OH^-$, $NO_3^-$ or other various salt types, though the $OH^-$ type can exhibit the most excellent effect.

The treatment of the polycarboxylic acid resin or its salt with the anion exchanger may be achieved by mixing the resin with an anion exchanger having a particle size of 1,200 microns or less with stirring, if necessary, with water. The most effective method comprises mixing the polycarboxylic acid resin, pigments, the anion exchange resin and, if necessary, water and then grinding the resulting mixture. By use of this method, the content of the lower pKa materials in the polycarboxylic acid resin can be rendered 1% or less. The treatment with an anion exchanger is preferably applied to a polycarboxylic acid resin neutralized with an amine or ammonium. According to this method, the lower pKa materials contained in the polycarboxylic acid resin can be easily dissociated.

A second method for rendering the content of the lower pKa materials small comprises adding water and/or a vinyl monomer at the end of the polymerization of a vinylic polycarboxylic acid resin and completing the polymerization. According to this method, the polymerizability of the vinylic polycarboxylic acid can be enhanced, whereby the content of a low molecular weight polymer of the acid having a lower pKa value or unpolymerized acid can be rendered very small. The thus obtained polycarboxylic acid resin may be treated with an anion exchanger according to the first method to obtain a more excellent effect.

After neutralizing the polycarboxylic acid resin obtained by the above-mentioned method with a base, the neutralized resin is diluted with deionized water to form an aqueous coating bath. When coating is effected in the thus obtained bath, the bath is replenished with a fresh coating composition corresponding to the nonvolatile matter taken out of the bath by coating. In this case, the prior art method replenishes the bath with a coating composition having a relation of $C_a > C_e$, and hence, an excess of a neutralizing agent is accumulated in the bath with the progress of coating. Therefore, the dispersion state of paint particles in the bath is varied with the lapse of time, and hence, a film formed from such a bath does not meet the desired standard and the characteristic properties thereof is deteriorated.

In order to remove said disadvantage, the coating composition with which the bath is replenished must have a degree of neutralization of $C_a = C_e$. Further, in the preparation of an aqueous coating bath, a coating composition having $C_a = C_e$ is preferably used, whereby the amount of the neutralizing agent in the bath can always be maintained constant and the control of the coating bath becomes very easy.

In order to satisfy such conditions, it is necessary to add 60% or less of water to a paint binder consisting essentially of a polycarboxylic acid resin or its salt having a lower pKa impurity content of 5% or less, preferably 1% or less and then treat the resulting mixture with a cation exchanger. The thus obtained paint binder contains the minimum amount of the neutralizing agent necessary for the resin component to be stably dispersed in water, and hence, can satisfy the relation of $C_a \approx C_e$. When such a paint binder is used in the preparation of an aqueous coating bath and as a replenishing paint, the neutralizing agent is substantially not accumulated in the bath with the progress of coating.

In the present invention, the amount of water added to the paint binder consisting essentially of a polycarboxylic acid resin or its salt is 60% by weight or less, preferably 15 to 60% by weight. When the water added is too little, the effect of the present invention cannot sufficiently be achieved. Further, when 60% by weight of water is added, it follows that a considerably large amount of a neutralizing agent is removed from the polycarboxylic acid resin salt, and hence, the dispersion stability of the paint binder in water is lower in some cases.

The polycarboxylic acid resin or its salt used in the present invention is required to have a lower pKa impurity content of 5% or less, preferably 1% or less. When a polycarboxylic acid resin or its salt containing more than 5% of said impurities is treated with a cation exchanger according to the present process, no effect aimed at by the present invention can be accomplished. The cation exchanger which may be used in the present invention are ion exchange resins and the like. Cation exchange type ion exchange resins exhibit the most excellent effect. As the cation exchange resin, there may be used various salt types, such as H type, Na type, K type and the like, though the use of H type cation exchange resins results in the most excellent effect.

The coating in an aqueous coating bath prepared by use of a paint binder containing the polycarboxylic acid resin or its salt obtained in a manner as mentioned above is effected as follows:

The paint binder treated with a cation exchanger is diluted with deionized water to a solids concentration of 1 to 20% by weight to form an aqueous coating bath. Since some of the coating composition is taken out of the bath by coating, the bath is replenished with a coating composition prepared by suitably diluting the paint binder treated with a cation exchanger with deionized water or the above aqueous coating bath.

Using the above-mentioned method, substantially no accumulation of an excess of neutralizing agent is caused in the aqueous coating bath, and hence, the control of the coating bath is very easy as compared with the prior art method. Further, a film formed from the coating bath has excellent properties.

In the present invention, the polycarboxylic acid resin may be colored by inorganic pigments, for example, titanium oxide, carbon black, cobalt blue, ultramarine blue, ceruleum, manganese chromium green, yellow iron oxide, cadmium yellow, phthalocyanine blue and the like. Strontium chromate and the like may be used as anticorrosive pigment.

In order to enhance the properties of a film obtained from the present aqueous coating composition, epoxy resins, aminoplasts and other plasticizers may be added to the composition. As the aminoplasts, N-alkoxymethylmelamines are preferable and N-alkoxymethylmelamines having 1 to 4 carbon atoms in the alkyl group are particularly preferable. Further, as the epoxy resins there are preferable those having an epoxy equivalent of 100 to 2,000 and particularly preferable is a reaction product of bisphenol A with epichlorohydrin. As the other plasticizers, octyl phthalate, nonylphenyl phthalate and butyl Cellosolve may be illustrated.

The water-dispersible or soluble coating composition obtained by the method of the present invention has a good dispersion stability in water, and when coating proceeds, substantially no accumulation of an excess of neutralizing agent in the bath is caused. Therefore, the control of the coating bath is very easy. Since the water-soluble or dispersible coating composition of the present invention is relatively hydrophobic, a film formed from this coating composition has excellent gloss and corrosion-resistance. Accordingly, a film formed by one-coat finish according to an electrodeposition coating using said water-soluble or dispersible coating composition is not inferior in any respect to a film formed from a conventional solvent-type paint. In addition, even when a substrate having a portion at which plates are piled on each other is coated with the present coating composition, substantially no paint flows out from the slit of the piled portion.

The invention is further explained below referring to Examples which are only by way of illustration and not by way of limitation.

REFERENCE EXAMPLE

Into a flask equipped with a stirrer, a reflux condenser and a thermometer were charged the following components, the temperature was elevated to 70° C. over 2.5 hrs., at which temperature the polymerization was effected for 5.5 hours, after which the temperature was further elevated to 75° C., at which temperature the reaction mixture was maintained for 4 hrs.:

| | Parts by weight |
|---|---|
| 2-Ethylhexyl acrylate | 39.9 |
| Styrene | 25.8 |
| N-butoxymethyl acrylamide | 19.1 |
| Itaconic acid | 3.23 |
| Azobisisobutyronitrile | 2.93 |
| 2-Mercaptoethanol | 1.12 |
| Isopropyl alcohol | 62.5 |

The thus obtained resin solution is designated as 1a.

In the same manner as above, the following components were subjected to polymerization to obtain a resin solution 1b:

| | Parts by weight |
|---|---|
| Ethyl acrylate | 24.8 |
| Styrene | 25.8 |
| N-butoxymethyl acrylamide | 19.1 |
| Itaconic acid | 3.23 |
| Azobisisobutyronitrile | 2.93 |
| 2-Mercaptoethanol | 1.12 |
| Isopropyl alcohol | 4.74 |

In the same manner as above, the following components were subjected to polymerization to obtain a resin solution 1c:

| | Parts by weight |
|---|---|
| 2-Ethylhexyl acrylate | 39.9 |
| Styrene | 25.8 |
| N-butoxymethyl acrylamide | 18.4 |
| Itaconic acid | 3.0 |
| Acrylamide | 1.0 |
| Azobisisobutyronitrile | 2.93 |
| 2-Mercaptoethanol | 1.12 |
| Isopropyl alcohol | 62.5 |

In the same manner as above, the following components were subjected to polymerization to obtain a resin solution 1d:

| | Parts by weight |
|---|---|
| Butyl acrylate | 33.3 |
| Styrene | 27.1 |
| Acrylic acid | 1.0 |
| N-butoxymethyl acrylamide | 22.0 |
| Itaconic acid | 3.63 |
| Isopropyl alcohol | 66.6 |
| Azobisisobutyronitrile | 3.37 |
| 2-Mercaptoethanol | 1.26 |

In the same manner as above, the following components were subjected to polymerization to obtain a resin solution 1e:

| | Parts by weight |
|---|---|
| Ethyl acrylate | 26.3 |
| Methyl methacrylate | 10.8 |
| Styrene | 5.0 |
| 2-Hydroxyethyl methacrylate | 9.8 |
| Itaconic acid | 0.98 |
| 2-Mercaptoethanol | 0.188 |
| Azobisisobutyronitrile | 2.2 |
| Isopropyl alcohol | 43.6 |

The resin solutions 1a–1e were neutralized with β-dimethylaminoethanol to an apparent neutralization degree α of 0.30 to 0.80 to form several neutralized solutions having different neutralization degrees for each resin solution. The thus neutralized solutions were diluted with deionized water to a solids concentration of 10% to form aqueous coating baths. The pH values of the resulting baths were measured at 25° C. From the relation between the pH values thus obtained and log $$\frac{\alpha}{1-\alpha}$$

in which α is the degree of neutralization of the polycarboxylic acid resin with a neutralizing agent (i.e., the equivalent ratio of β-dimethylaminoethanol to the apparent COOH groups in the resin), the pKa(r) values and the n values were calculated according to the equation [A]. The results obtained were as shown in Table 1.

TABLE 1

| Kind of resin | 1a | 1b | 1c | 1d | 1e |
|---|---|---|---|---|---|
| pKa(r) | 8.8 | 7.8 | 9.12 | 9.12 | 8.23 |
| n | 1.15 | 1.20 | 0.98 | 0.96 | 1.09 |

The resin solutions 1a, 1b, 1c, 1d and 1e were neutralized with β-dimethylaminoethanol to an apparent neutralization degree α of 0.45 to obtain neutralized resin solutions 1a', 1b', 1c', 1d' and 1e', respectively, which were then mixed in a proportion as shown in Table 2. The thus obtained mixed resin solutions were formed into paints by the following procedure: 75 parts by weight of titanium oxide JR-600E (trade name of Teikoku Kako Co., Ltd.) was added to 100 parts by weight of the mixed resin solution, the resulting mixture was mixed on a ball mill for 24 hours and then 200 parts by weight of the mixed resin solution was added thereto, after which mixing was continued for a further 24 hrs. to obtain a white enamel paste. The white enamel paste obtained was diluted with deionized water to a solids content of 10% by weight to prepare an aqueous coating bath.

A zinc phosphate-treated iron plate (Bondelite #100) was coated under the following conditions: Voltage: 80 v.; temperature: 25° C.; electrodeposition time: 3 min. The thus obtained coated plate was baked at 180° C. for 30 min. The stability of the bath and the gloss value of a film obtained were as shown in Table 2.

TABLE 2

| Resin blend system | No. | Resin weight fraction ratio | Stability of coating bath | Gloss value 60°-60° of film obtained, percent | | Difference of pKa(r) (absolute) |
|---|---|---|---|---|---|---|
| | | | | 1st day from preparation of bath | 7th day from preparation of bath | |
| 1a'/1b' | 1 | 1/0(1a) | Good | 87.8 | 94.5 | 0 |
| | 2 | 8/2 | Bad | 61.8 | 4.9 | 1.0 |
| | 3 | 5/5 | Bad | 23.4 | 29.0 | 1.0 |
| | 4 | 2/8 | Somewhat bad | 55.1 | 51.5 | 1.0 |
| | 5 | 0/1 | Good | 61.5 | 41.6 | 0 |
| 1a'/1e' | 6 | 1/0(1a) | do | 89.0 | | 0 |
| | 7 | 8/2 | Somewhat bad | 75.2 | | 0.57 |
| | 8 | 5/5 | Bad | 37.9 | | 0.57 |
| | 9 | 2/8 | Bad | 48.0 | | 0.57 |
| | 10 | 0/1 | Good | 79.0 | | 0 |
| 1c'/1d' | 11 | 0/1(1d) | do | 76.6 | 75.0 | 0 |
| | 12 | 2/8 | do | 73.7 | 77.0 | 0 |
| | 13 | 5/5 | do | 83.5 | 77.7 | 0 |
| | 14 | 8/2 | do | 82.3 | 75.1 | 0 |
| | 15 | 1/0 | do | 76.0 | 73.2 | 0 |

As is clear from Table 2, the stability of the coating baths (Nos. 2, 3, 4, 7, 8 and 9) obtained by use of the mixed resins in which a resin having a difference in pKa(r) from the main resin constituting the coating composition of at least 0.5 is mixed is bad. Further, the gloss value of film formed by electrodeposition coating is also low. On the other hand, the stability of the coating baths (Nos. 1, 5, 6, 10, 11, 12, 13, 14 and 15) obtained from the resins prepared by the method of the present invention is good, and the gloss value of the film formed by electrodeposition coating is high. In the above table, gloss value was measured according to 60°-60° mirror surface reflection method (hereinafter the gloss value is measured by this method).

The white enamel obtained from the resin solution of 1c' as the same method as above was diluted with deionized water to a solids content of 13% by weight to prepare a coating bath. After the preparation of the coating bath, electrodeposition was effected every day at 80 v. at 25° C. for an electrodeposition time of 2.5 min., and the gloss value of the film obtained and the specific conductivity of the bath were measured to obtain results as shown in Table 3.

TABLE 3

| Days | Solids conc., percent | Specific conductivity per 1% of solids [1] | Gloss, percent |
|---|---|---|---|
| 0 | 12.9 | 0.170 | 86 |
| 2 | 12.8 | 0.218 | 80 |
| 4 | 12.7 | 0.248 | 76 |
| 6 | 12.7 | 0.283 | 72 |
| 8 | 12.4 | 0.320 | 70 |
| 10 | 12.3 | 0.341 | 70 |

[1] (K/C($10^2 \mu\Omega$/cm.)).

The cause of an increase of specific conductivity of the coating bath was found to be the amine salt of unpolymerized itaconic acid contained in the paint particles in the bath by the analysis of the behaviour of pH in the aqueous coating bath, the measurement of the double bond content in the water in the bath, the measurement of infrared absorption spectrum, the variation of the amount of the remaining itaconic acid depending upon the composition of the solution and the analysis of electrodeposition current curve.

EXAMPLE 1

[I] In the same polymerization manner as in the Reference Example, the following components were subjected to polymerization to obtain a resin solution 2a:

| | Parts by weight |
|---|---|
| Tridecyl methacrylate | 35.9 |
| Styrene | 26.3 |
| 2-Hydroxyethyl methacrylate | 11.6 |
| N-butoxyethyl methacrylate | 13.3 |
| Itaconic acid | 3.9 |
| Azobisisobutyronitrile | 2.81 |
| 2-Mercaptoethanol | 1.07 |
| Isopropyl alcohol | 78.1 |

The resin solution 2a was neutralized with β-dimethylaminoethanol to a neutralization degree α of 0.45 and 30 parts by weight of hexabismethoxymethylmelamine resin was added to 100 parts by weight of the resulting neutralized resin solution. The resulting mixture was well blended and designated as resin solution 2b.

[II] The same monomeric components as used in above [I] was subjected to polymerization, and deionized water was added thereto in a proportion of 10 g. per kg. of the resin solution just before the end of polymerization and the temperature was elevated to 80° C. and then azobisisobutyronitrile was added thereto 5 times at intervals of 10 min. in a proportion of 1 g. per kg. of the resin solution. The polymerization was thereafter continued for 2 hrs. at 80° C. to obtain a resin solution 2c.

[III] The same procedure as in above [II] was repeated, except that in place of the deionized water, a mixture of deionized water and ethyl acrylate (4:10 by weight) was added in a proportion of 35 g. per kg. of the resin solution to obtain a resin solution 2d.

The resin solution 2a was subjected to the measurement of pKa and $n$ values to find that pKa(r) is 9.10 and $n$ is 1.16.

The resin solutions 2b, 2c and 2d were neutralized with β-dimethylaminoethanol to a neutralization degree of α of 0.45, from which white enamel pastes were prepared in the same manner as in the Reference Example. The thus obtained pastes were designated as white enamel pastes 2b', 2c' and 2d', respectively.

To white enamel paste 2b' was added the β-dimethylaminoethanol salt of itaconic acid in a proportion of 0 g., 2.4 g. or 4.8 g. per kg. of the paste. The resulting pastes were designated as white enamel pastes $2b'_1$, $2b'_2$ and $2b'_3$, respectively. These pastes were diluted with water to a solids concentration of 13% to prepare aqueous coating baths.

Further, the white enamel paste $2b'_3$ was treated with 50 g. of deionized water/1 kg. paste and 15 g. of OH type anion exchange resin powder/1 kg. of the paste, in which the ion exchange resin powder having a particle size of 200 mesh or less Diaion SA-20A (Mitsubishi Kasei Co., Ltd.), and then the resulting mixture was filtered to obtain the white paste 2e. The white enamel paste 2e was diluted with deionized water to obtain the coating bath of a solids content of 13% by weight and the coating bath was treated with the same manner as above.

The stabilities of the thus prepared aqueous coating baths were as shown in Table 4.

TABLE 4

| White enamel paste | $2b'_1$ | | $2b'_2$ | | $2b'_3$ | | 2c' | | 2d' | | 2e' | |
|---|---|---|---|---|---|---|---|---|---|---|---|---|
| Measured values | N.V. | K/C | N.V. | K/C | N.V. | K/C | N.V. | K/C | N.V. | K/C | N.V. | K/C |
| Days after preparation of bath: | | | | | | | | | | | | |
| 0 | 13.2 | 0.230 | 13.2 | 0.315 | 13.1 | 0.383 | 13.1 | 0.180 | 13.3 | 1.067 | 13.3 | 0.141 |
| 7 | 13.5 | 0.383 | 12.9 | 0.528 | 10.1 | 0.746 | 14.4 | 0.335 | 13.6 | 0.303 | 14.2 | 0.210 |

Note.—N.V. refers to solids concentration (percent) in the aqueous coating bath and K/C refers to specific connectivity of the aqueous coating bath in which the solids concentration is 1% ($10^2 \mu\Omega$/cm.).

From Table 4, the following can be seen:

In the case of the aqueous coating baths prepared from white enamel pastes 2b′₂ and 2b′₃ containing the β-dimethylaminoethanol salt of itaconic acid having a pKa(e) value at least 0.5 different from the pKa(r) value of the main constituent resin of the resin solution, the solids concentration in the bath was greatly decreased and the specific conductivity of the bath is greatly increased, and hence, the stability of the bath was bad. On the other hand, white enamel pastes 2b′₁, 2c′, 2d′ and 2e′ which were prepared according to the method of the present invention formed coating baths having good stability.

The aqueous coating baths prepared from the resin solutions containing more than 5% of itaconic acid having a pKa(e) value at least 0.5 far from the pKa(r) value of the main constituent resin of the resin solution (2b′₂ and 2b′₃) were bad in stability.

EXAMPLE 2

The resin solution 2a obtained in Example 1 was neutralized with β-dimethylaminoethanol to a neutralization degree α of 0.45, and 50 g. of deionized water was added to 1 kg. of the thus obtained neutralized resin solution, and nothing was added to another 1 kg. of the neutralized resin solution. To each was added 6 g. of an OH type anion exchange resin having a particle size smaller than 200 mesh (Diaion SA–20A prepared by Mitsubishi Kasei Co., Ltd.), and the resulting mixtures were stirred at 40° C. for 3 hrs. and then filtered to obtain resin solutions 3b and 3a, respectively.

Resin solutions 3a and 3b were subjected to the measurement of pKa(r) and $n$ values in the same manner as in the Reference Example to find that the pKa(r) value of the polycarboxylic acid resin in the resin solution 3a was 9.08, and the $n$ value thereof was 1.10, while the pKa(r) value of the polycarboxylic acid resin in the resin solution 3b was 9.08 and the $n$ value thereof was 1.12. Further, the acid values of resin solutions 2a neutralized to α of 0.45 and 3b were 19.5 and 17.3, respectively. Further, from the analysis of the material adsorbed on the ion exchange resin, it was observed that the unpolymerized itaconic acid was removed from the resin solution by adding the ion exchange resin.

Resin solutions 2a neutralized to α of 0.45, 3a and 3b were diluted with water to a solids concentration of about 11%, and the stabilities of the thus prepared aqueous coating baths were measured to obtain the results as shown in Table 5. As is clear from this table, the stability of the aqueous coating baths obtained from resin solutions 3a and 3b which were prepared by the method of the present invention is very good.

In the same manner as in Example 1, white enamel pastes [2a], [3a] and [3b] were prepared from resin solutions 2a (neutralized to α of 0.45, 3a and 3b, respectively, and then diluted with water to a solids concentration of about 13% to prepare aqueous coating baths. The same zinc phosphtae-treated iron plate (Bondelite #100) was subjected to electrodeposition coating in the resulting coating bath at 120 v. for an electrodeposition period of 2 min. The resulting film was baked at 180° C. for 30 min. The characteristics of the thus obtained film and the stability of the bath were as shown in Table 6. As is clear from Table 6, the gloss value of the film obtained from enamel pastes 3a and 3b which were obtained by the method of the present invention was high and the reduction of the solids content of the bath was small and the variation in specific conductivity of the bath was also small. From this fact, it can be understood that the stability of the bah from the present coating composition is good and the present coating composition can produce a film having excellent properties.

TABLE 5

| Resin solution used | Days after preparation of bath | N.V., percent | pH | K/C (10² μΩ/cm.) |
|---|---|---|---|---|
| 2a (neutralized to α of 0.45) | 0 | 11.6 | 8.98 | 0.246 |
|  | 7 | 13.5 | 8.92 | 0.444 |
| 3a | 0 | 11.4 | 8.98 | 0.238 |
|  | 7 | 14.0 | 9.10 | 0.399 |
| 3b | 0 | 11.4 | 9.05 | 0.210 |
|  | 7 | 15.0 | 9.15 | 0.350 |

NOTE.—N.V. and K/C are the same as defined above.

TABLE 6

| White enamel paste used | Days after preparation of bath | Gloss, percent | Film thickness (μ) | N.V., percent | pH | K/C (10² μΩ/cm.) |
|---|---|---|---|---|---|---|
| (2a) | 0 | 70.5 | 39 | 12.9 | 9.02 | 0.241 |
|  | 7 | 71.8 | 26 | 13.0 | 8.90 | 0.400 |
|  | 14 | 71.9 | 29 | 13.3 | 8.97 | 0.486 |
| (3a) | 0 | 77.1 | 32 | 12.9 | 9.21 | 0.177 |
|  | 7 | 75.0 | 26 | 13.4 | 9.18 | 0.332 |
|  | 14 | 75.8 | 28 | 14.9 | 9.02 | 0.466 |
| (3b) | 0 | 78.5 | 30 | 12.9 | 9.27 | 0.158 |
|  | 7 | 79.7 | 27 | 13.6 | 9.24 | 0 310 |
|  | 14 | 78.5 | 27 | 15.4 | 9.12 | 0.430 |

NOTE.—N.V. and K/C are the same as defined above.

EXAMPLE 3

[I] 120 Parts by weight of the resin solution 2b obtained in Example 1 and 75 parts by weight of titanium oxide JR 600E (Teikoku Kako) were blended for 24 hrs., 240 parts by weight of resin solution 2b was then added and the resulting mixture was blended for a further 24 hrs. to obtain a white enamel paste which is designated as 4a. 1 kg of the thus obtained white enamel paste 4a, 50 g. of deionized water and 6 g. of an OH type anion exchange resin having a particle size of 50 to 200 mesh were mixed and then subjected to heat-treatment at 40° C. for 3 hours and filtered. The thus obtained white enamel paste is designated as 4b.

[II] In the preparation of white enamel paste 4a in above [I], 4 g. of an OH type anion exchange resin having a particle size of about 1,200μ was added together with the 240 parts by weight of second resin solution 2b, and the resulting mixture was milled (in this case, the ion exchange resin was pulverized to a particle size smaller than 200 mesh) to obtain a white enamel paste which is designated as 4c.

[III] White enamel pastes 4a, 4b and 4c were diluted with water to a solids concentration of 14 to 15% to prepare aqueous coating baths, in which baths a zinc phosphate-treated iron plate was subjected to electro-deposition coating at 120–300 v. for an electrodeposition time of 2.5 min. and then to baking at 180° C. for 30 min. The results obtained were as shown in Table 7.

TABLE 7

| White enamel paste | Days after preparation of bath | Gloss, percent | Film thickness (μ) | N.V., percent | pH | K/C |
|---|---|---|---|---|---|---|
| 4a | 0 | 81.3 | 40 | 15.9 | 9.05 | 0.181 |
|  | 7 | 78.0 | 25 | 16.5 | 8.98 | 0.319 |
|  | 14 | 84.5 | 29 | 18.5 | 8.92 | 0.420 |
| 4b | 0 | 81.3 | 30 | 16.3 | 9.24 | 0.139 |
|  | 7 | 80.5 | 28 | 17.1 | 9.22 | 0.245 |
|  | 14 | 86.5 | 27 | 19.6 | 8.98 | 0.369 |
| 4c | 0 | 81.0 | 29 | 16.2 | 9.25 | 0.135 |
|  | 7 | 80.8 | 27 | 17.2 | 9.24 | 0.240 |
|  | 14 | 85.4 | 28 | 20.0 | 9.15 | 0.364 |

NOTE.—N.V. and K/C are the same as defined above.

From Table 7, it is clear that in the case of the aqueous coatings baths formed from the white enamel pastes 4b and 4c obtained by the present method, the increase in specific conductivity is small and the reduction in solids content in the bath is also small, and hence, the stability of bath is very excellent. Further, the variation of thickness of the film and the variation of gloss both are small, and hence, the coating composition obtained by the method of the present invention is clearly excellent.

EXAMPLE 4

The white enamel paste 4b obtained in Example 3 was diluted with deionized water to a solids concentration of 15%. To 1 kg. of the resulting water dispersion was added 10 g. of an H type weak acid type cation exchange resin (Diaion WK-10, made by Mitsubishi Kasei), and the resulting mixture was stirred for about 30 min., whereby the pH value of the bath was varied from 9.24 to 8.1-8.5. The ion exchange resin was removed from the dispersion by filtration to obtain a coating bath, which is designated as 5a.

White enamel paste 4b and coating bath 5a were diluted with water to a solids concentration of about 11% or 15%, to prepare coating baths, in which zinc phosphate-treated iron plates were subjected to electrodeposition coating at 200-300 v. and then to baking. The characteristisc of bath and the characteristics of film were as shown in Table 8.

TABLE 8

| Bath | Days after preparation of bath | Gloss, percent | Film thickness (μ) | N.V., percent | pH | K/C |
|---|---|---|---|---|---|---|
| 4b | 0 | 79.0 | 30 | 11.1 | 9.24 | 0.144 |
|    | 7 | 78.0 | 28 | 11.1 | 9.30 | 0.310 |
|    | 14 | 81.5 | 32 | 11.1 | 9.08 | 0.491 |
| 5a | 0 | 82.0 | 34 | 11.2 | 8.55 | 0.141 |
|    | 7 | 84.0 | 33 | 11.0 | 8.70 | 0.230 |
|    | 14 | 83.5 | 32 | 11.8 | 8.65 | 0.326 |
| 4b | 0 | 82.0 | 32 | 14.3 | 9.38 | 0.158 |
|    | 7 | 83.5 | 33 | 14.7 | 9.36 | 0.247 |
|    | 14 | 81.8 | 34 | 15.9 | 9.18 | 0.397 |
| 5a | 0 | 85.2 | 35 | 14.0 | 8.18 | 0.136 |
|    | 7 | 86.3 | 36 | 14.9 | 8.22 | 0.191 |
|    | 14 | 85.6 | 37 | 16.5 | 8.25 | 0.254 |

Note.—N.V. and K/C are the same as defined above.

White enamel pastes 4a and 4b and a coating bath 5a were dilute with water to a solids concentration of about 15% to prepare aqueous coating baths, in which electrodeposition coating was effected. The results obtained were as shown in Table 9.

TABLE 9

| Bath | 150 hrs. salt solution spraying test, Scotch tape peeling width (mm.) (one side) | 300 hrs. salt solution spraying test, Scotch tape peeling width (mm.) (one side) |
|---|---|---|
| 4a | 3-4 | 8-10 |
| 4b | 0-1 | 3 |
| 5a | 0-0.5 | 3 |

In the above test, the salt spray test was carried out in such a manner that the film was linearly cut to form a linear portion on the film surface and was sprayed with a 5% aqueous sodium chloride solution at 40° C. for 48 hours, and then the cut portion was peeled off by use of an adhesive tape. The result of the salt spray test was represented by the one side width of peeled film from the cut portion of the film at the time when the film had been peeled.

It is clear from Table 9 that the film formed from the white enamel paste 4b and the coating bath 5a obtained by the method of the present invention are much superior in corrosion resistance to the film obtained from the white enamel paste 4a obtained by the conventional method.

EXAMPLE 5

The white enamel paste 4b obtained in Example 3 was diluted with water to a solids concentration of 35% and then treated with a cation exchange resin in the same manner as in Example 4 to obtain a coating dispersion, which is designated as 6a. The coating dispersion 6a was diluted with water to a solids concentration of about 15%, which is designated as 6b. The coating dispersion 6a was separately diluted with an aqueous coating bath to a solids concentration of about 15%, which is designated as 6c.

White enamel paste 4b was diluted to a solids content of about 15%, which is designated as 6d.

The coating dispersion 6a was diluted with the coating bath 6c to obtain a coating bath, which is designated as 6e.

Using the coating baths 6b, 6d and 6e as aqueous coating bath and replenishing coating composition, electrodeposition coating was effected in the same manner as in the Reference Example to obtain results as shown in Table 10, in which the coating rate was 0.2 turnover per day.

TABLE 10

| Bath | | | | | | |
|---|---|---|---|---|---|---|
| Resin solution for preparation of bath | Replenishing resin solution | Turnover | N.V. (percent) | pH | K/C | Amino content* (percent) |
| 6d | 6d | 0 | 15.0 | 8.8 | 0.189 | 14.2 |
|    |    | 1 | 14.9 | 9.1 | 0.260 | 18.0 |
|    |    | 2 | 15.0 | 9.7 | 0.330 | 22.0 |
|    |    | 3 | 15.1 | 9.9 | 0.410 | 26.0 |
| 6b | 6b | 0 | 15.0 | 8.1 | 0.145 | 11.0 |
|    |    | 1 | 15.1 | 8.15 | 0.200 | 11.2 |
|    |    | 2 | 15.1 | 8.10 | 0.244 | 11.4 |
|    |    | 3 | 15.1 | 8.12 | 0.247 | 12.5 |
| 6b | 6e | 0 | 15.1 | 8.08 | 0.145 | 11.1 |
|    |    | 1 | 15.1 | 8.11 | 0.210 | 11.1 |
|    |    | 2 | 15.1 | 8.12 | 0.233 | 11.2 |
|    |    | 3 | 15.1 | 8.11 | 0.247 | 11.3 |

Note: N.V. and K/C are the same as above, and (*) coresponds to $C_b$ in equation [D].

EXAMPLE 6

[I] To 150 g. of the white enamel paste 4b obtained in Example 3 was added 4.25 g. of an anticorrosive pigment Organochrome (A) (made by Taito Pfizer) and these were mixed for 24 hrs., after which 300 g. of white enamel paste 4b was added thereto and the resulting mixture was mixed for 24 hrs. to obtain a paste, which is designated as 7a.

Paste 7a (24 g.), white enamel paste 4b (96 g.) and deionized water (380 g.) were mixed to obtain a coating bath, which is designated as 7b.

[II] The neutralized resin solution of 2a ($\alpha=0.45$) obtained in Example 2 was mixed with same anticorrosive pigment as in above [II] in the same manner as in above [I] to obtain a paste, which is designated as 7c.

[III] The coating bath 7b, paste 7c, white enamel paste 4b, the coating bath 5a and the white enamel paste 2b' were diluted with deionized water to a solids concentration of 15% to prepare aqueous coating baths. The mechanical stability of the resulting aqueous coating baths was as shown in Table 11. In the baths, electrodeposition coating was effected at 120-250 v. for an electrodeposition period of 2.5 min. in the same manner as in the Reference Example, and the resulting film was baked at 180° C. for 30 min. The properties of the films obtained were as shown in Table 11.

TABLE 11

| Run number | Paste or bath used | Days after preparation of bath | Gloss (percent) | Film thickness (F) | N.V. (percent) | pH | K/C | Mechanical stability [1] | Corrosion resistance [2] |
|---|---|---|---|---|---|---|---|---|---|
| 1 | 7b | 0 | 82.5 | 30 | 14.1 | 8.9 | 0.23 | 29 | 1.5 |
|   |    | 7 | 82.3 | 29 | 15.7 | 8.8 | 0.44 |    |     |
| 2 | 5a | 0 |      |    |      |     |      | 68 | 1.5 |
|   |    | 7 |      |    |      |     |      |    |     |
| 3 | 2b' | 0 |     |    |      |     |      | 81 | 4 |
|   |    | 7 |      |    |      |     |      |    |     |
| 4 | 4b | 0 |      |    |      |     |      | 10 | 2 |
|   |    | 7 |      |    |      |     |      |    |     |
| 5 | 7c | 0 | 82.0 | 30 | 15.0 | 9.12 | 0.25 | 100 | 1.5 |
|   |    | 7 | 82.5 | 28 | 13.1 | 9.10 | 0.48 |     |     |

[1] Measured by means of a homogenizer which can be rotated at a high speed (500–12,000 r.p.m.), 100 g. of a bath liquid was placed in a 100 cc. beaker and agitated at 8,000 r.p.m. for 10 min., and the amount of precipitate was measured. The amount of precipitate of No. 5 was defined as 100, and the amounts of precipitates of Nos. 1 to 4 are shown in ratio to No. 5. The smaller the figure, the better the stability of bath.

[2] A film obtained by electrodeposition coating was baked, and then the coated panel was cross linked and treated with salt solution spray at 40° C. for 150 hrs., after which the cross-cut parts were peeled off by means of Scotch tape. The width of peeling on one side is shown in mm.

NOTE.—N.V. and K/C are the same as defined above.

EXAMPLE 7

The white enamel paste 4b obtained in Example 3 (100 by weight) was mixed with butyl Cellosolve (5 parts by weight), and the resulting mixture, which is designated as enamel paste 8a, was mixed with an epoxy resin (Epon 828 of Shell Chemical) (5 parts by weight). The resulting mixture, which is designated as enamel paste 8b, was mixed with dioctyl phthalate (5 parts by weight) to obtain an enamel paste, which is designated as enamel paste 8c. The enamel paste 8a, 8b and 8c were diluted with deionized water to a solids content of 15% to prepare aqueous coating baths, in which electrodeposition was then effected in the same manner as in Example 6. The properties of the films obtained were as shown in Table 12.

TABLE 12

| Resin solution | Days after preparation of bath | Gloss (percent) | Film thickness ($\mu$) | N.V. (percent) | pH | K/C |
|---|---|---|---|---|---|---|
| 4b | 0 | 82.0 | 32 | 14.3 | 9.38 | 0.158 |
|    | 7 | 83.5 | 33 | 15.9 | 9.18 | 0.397 |
| 8a | 0 | 85.6 | 35 | 14.5 | 9.39 | 0.150 |
|    | 7 | 84.9 | 37 | 15.9 | 9.28 | 0.380 |
| 8b | 0 | 91.5 | 38 | 14.8 | 9.35 | 0.151 |
|    | 7 | 91.8 | 39 | 16.2 | 9.27 | 0.375 |
| 8c | 0 | 88.7 | 36 | 14.6 | 9.38 | 0.149 |
|    | 7 | 88.9 | 37 | 15.9 | 9.30 | 0.390 |

NOTE: N.V. and K/C are the same as defined above.

What is claimed is:

1. A method for preparing a purified, water-soluble or dispersible coating composition, which comprises mixing with stirring an anion exchanger having a three dimensional structure with a paint binder consisting essentially of a polycarboxylic acid resin having an average characteristic value pKa(r) of at least 8.0 and $0.8 \leq n \leq 2.5$, or a salt thereof, said characteristic value being defined by the equation $$pH = pKa(r) + n \log \frac{\alpha}{1-\alpha}$$

wherein pKa(r) is a constant represented by $-\log Ka(r)$ in which Ka(r) is the dissociation constant in water of the acid groups of the polycarboxylic acid resin; $\alpha$ is a degree of neutralization of the whole of the acid groups of the polycarboxylic acid resin with a neutralizing agent (equivalent ratio of the neutralizing agent to the whole acid group) and $0.15 \leq \alpha \leq 0.80$; and $n$ is a constant indicating the extension of the polycarboxylic acid resin in water to react said anion exchanger with the impurities contained in said paint binder, said impurities being composed mainly of (i) polycarboxylic acid resins having a pKa(r) value at least 0.5 smaller than the pKa(r) value of the main polycarboxylic acid resin constituting the paint binder, or salts thereof, and (ii) low molecular weight acids having a characteristic value pKa(e) at least 0.5 smaller than the pKa(r) value of the main polycarboxylic acid resin, or salts of said acids, the pKa(e) being defined by equation $$pH = pKa(e) + \log \frac{\alpha}{1-\alpha}$$

wherein pKa(e) is a constant represented by $-\log Ka(e)$ in which Ka(e) is a dissociation constant in water of the low molecular weight acids or their salts contained in the paint binder; and $\alpha$ is a degree of neutralization of the acid groups of the low molecular weight acids with a neutralizing agent (equivalent ratio of the neutralizing agent to the acid groups)

removing the anion exchanger by filtration from the paint binder, whereby the content of the impurities in the paint binder becomes 5% or less, and thereafter diluting the paint binder with water.

2. A method according to Claim 1, wherein the reaction of the paint binder is effected by adding to the polycarboxylic acid resin or its salt an OH type anion exchange resin having a particle size of 1,200 microns or less and, if necessary, water, and then mixing the resulting mixture.

3. A method according to Claim 1, wherein the paint binder is an amine salt of a polycarboxylic acid resin obtained by subjecting to copolymerization a combination of (1) 5 to 80 mole percent of at least one compound represented by the formula:

(I)

wherein R is H or $CH_3$ and $R_1$ is a straight chain or branched chain alkyl group having 1 to 18 carbon atoms, (2) 60 mole percent or less of a compound represented by the formula:

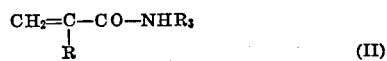

(II)

wherein R is the same as defined above and $R_3$ is hydrogen or $-CHR_4OR_5$ in which $R_4$ is hydrogen or a straight or branched chain or cyclic alkyl group having 1 to 8 carbon atoms and $R_5$ is a straight or branched chain or cyclic alkyl group having 1 to 8 carbon atoms, and/or a compound represented by the formula:

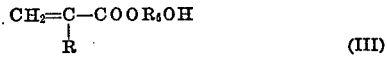

(III)

wherein R is the same as defined above and $R_6$ is a substituted or unsubstituted alkylene group having 1 to 8 carbon atoms, (3) 1 to 30 mole percent of an α,β-monoethylenically unsaturated carboxylic acid or an anhydride thereof and (4) 5 to 40 mole percent of at least one vinyl monomer copolymerizable with these monomers, the total sum of (1), (2), (3) and (4) being 100 mole percent.

4. A method according to Claim 3, wherein the polycarboxylic acid resin is prepared by adding water and/or a copolymerizable monomer to the polymerization system at the end of polymerization and then continuing the polymerization.

5. A method according to claim 1, wherein the reaction of the paint binder is effected by mixing a salt of the polycarboxylic acid resin with a pigment to form an enamel, adding to the enamel an OH type anion exchange resin having a particle size smaller than 1,200 microns and, if necessary, water, and then stirring the resulting mixture.

6. A method according to Claim 1, wherein the reaction of the paint binder is effected by mixing a salt of the polycarboxylic acid resin with a pigment and an OH type anion exchange resin having a particle size smaller than 1,200 microns, and, if necessary, water and then grinding the resulting mixture.

7. A method according to Claim 3, wherein the α,β-monoethylenically unsaturated carboxylic acid or its anhydride is a monomer having the formula (IV) and/or its half alkyl esters:

wherein $m$ is 1 or 2.

8. A method according to Claim 3, wherein the polycarboxylic acid resin is in the form of a mixture with an epoxy resin and/or a melamine resin in a ratio of 100/0 to 60/40.

9. A method according to Claim 7, wherein the (2) component consists of 5 to 40 mole percent of the formula (II) monomer and 5 to 40 mole percent of the formula (III) monomer, the total sum of the two being 5 to 60 mole percent.

10. A method for preparing a water-soluble or dispersible coating composition, which comprises reacting a paint binder with an anion exchanger, said paint binder being mainly composed of a polycarboxylic acid resin having an average pKa(r) value defined in Claim 1 of 8.0 or more and $0.8 \leq n \leq 2.5$, or a salt thereof, to make 5% or less the content of impurities in the paint binder, said impurities being mainly composed of (i) polycarboxylic acid resins having a pKa(r) value defined in Claim 1 at least 0.5 smaller than the pKa(r) value of the main polycarboxylic acid resin constituting the paint binder, or salts thereof, and (ii) low molecular weight acids having a pKa(e) value defined in Claim 1 at least 0.5 smaller than the pKa(r) of the main polycarboxylic acid resin, or salts of said acids, adding 60% by weight or less of water or neutralizing agent-containing water to the thus treated paint binder and then treating the resulting mixture with a cation exchanger.

11. A method according to Claim 10, wherein 15% by weight or less of water is added to the salt of the polycarboxylic acid resin or its salt and the resulting mixture is treated with an OH type anion exchange resin.

12. A method according to Claim 11, wherein the neutralizing agent-containing water is water containing a salt of a polycarboxylic acid resin having an average pKa(r) value defined in Claim 1 of 8.0 or more, and $0.8 \leq n \leq 2.5$.

13. A method according to Claim 11, wherein the cation exchanger is an H type cation exchange resin.

14. A method which comprises reacting with an anion exchanger a paint binder composed mainly of a polycarboxylic acid resin having an average pKa(r) value defined in Claim 1 of 8.0 or more and $0.8 \leq n \leq 2.5$, or a salt thereof, to make 5% or less the content of impurities in the paint binder, said impurities being composed mainly of (i) polycarboxylic acid resins having a pKa(r) value defined in Claim 1 at least 0.5 smaller than that of the main polycarboxylic acid resin constituting the paint binder, or salts thereof, and (ii) low molecular weight acids having a pKa(e) value defined in Claim 1 at least 0.5 smaller than the pKa(r) value of the main polycarboxylic acid, or salts of said acids, adding to the thus treated paint binder 60% by weight or less of water or neutralizing agent-containing water, treating the resulting mixture with a cation exchanger to obtain a coating composition, diluting the coating composition with deionized water to a solids content of 20% by weight or less to form an aqueous coating bath and effecting coating in said coating bath while replenishing the bath with said coating composition corresponding to the nonvolatile matter taken out of the bath by coating.

15. A method according to Claim 14, wherein the paint binder is a polycarboxylic acid resin prepared by subjecting to copolymerization a combination of (1) 5 to 80 mole percent of at least one compound having the formula:

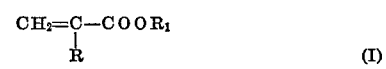

wherein R and $R_1$ are the same as defined in Claim 3, (2) 60 mole percent or less of a compound having the formula:

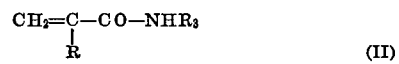

wherein R and $R_3$ are the same as defined in Claim 3, and/or a compound having the formula:

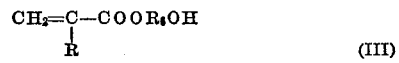

wherein R and $R_6$ are the same as defined in Claim 3, (3) 1 to 30 mole percent of an α,β-monoethylenically unsaturated carboxylic acid or its anhydride and (4) 5 to 40 mole percent of at least one vinyl monomer copolymerizable with these monomers, the total of the monomers being 100 mole percent.

16. A method according to Claim 15, wherein the (2) component consists of 5 to 40 mole percent of the formula (II) monomer and 5 to 40 mole percent of the formula (III) monomer, the total sum of the two monomers being 5 to 60 mole percent, and the α,β-monoethylenically unsaturated carboxylic acid is a monomer represented by the formula (IV) or its half alkyl ester:

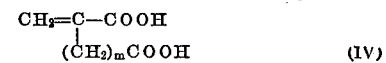

wherein $m$ is 1 or 2.

17. A method according to Claim 14, wherein the coating is an electrodeposition coating.

18. A method which comprises polymerizing a combination of 5 to 80 mole percent of at least one monomer represented by the formula:

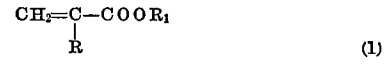

wherein R and $R_1$ are the same as defined in Claim 3, 5 to 40 mole percent of a monomer represented by the formula:

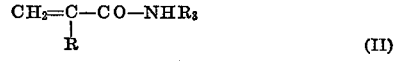

wherein R and $R_3$ are the same as defined in Claim 3, 5 to 40 mole percent of a monomer represented by the formula:

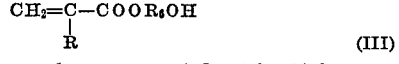

wherein R and $R_6$ are the same as defined in Claim 3, 1 to 30 mole percent of a monomer represented by the formula (IV) and/or its half alkyl ester:

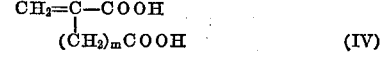

wherein m is 1 or 2, and 5 to 40 mole percent of a vinyl monomer copolymerizable with these monomers, the total sum of these monomers being 100 mole percent, neutralizing the thus obtained polycarboxylic acid resin with an amine or ammonia to form a salt of a polycarboxylic acid resin having an average pKa(r) value defined in Claim 1 of 8.0 or more and $0.8 \leq n \leq 2.5$, and adding, if necessary, a pigment to the salt to form a paint binder for electrodeposition coating, forming an electrodeposition coating bath having a one-coat finish adaptability from said paint binder and effecting electrodeposition coating in said bath while replenishing the bath, characterized in that the paint binder is reacted with an anion exchanger to make 5% or less the content of impurities in the binder, said impurities being composed mainly of (i) salts of polycarboxylic acid resins having a pKa(r) value defined in Claim 1 at least 0.5 smaller than the pKa(r) value of the main polycarboxylic acid resin constituting the paint binder and (ii) salts of the low molecular weight acids having a pKa(e) value defined in Claim 1 at least 0.5 smaller than the pKa(r) of the main polycarboxylic acid resin, 60% by weight or less of water or neutralizing agent-containing water is added to the thus treated paint binder, the resulting mixture is reacted with a cation exchanger to form an electrodeposition coating composition having a one-coat finish adaptability, this electrodeposition coating composition is diluted with water to a solids content of 1 to 20% by weight to form an electrodeposition coating bath, and said electrodeposition coating composition is supplied into the bath while effecting electrodeposition coating in said bath corresponding to the nonvolatile matters taken out of the bath by coating.

19. A method according to Claim 6, wherein the pigment comprises mainly an inorganic pigment and anticorrosive pigment.

20. A method of Claim 1, wherein said anion exchanger is a hydroxy-type anion exchanger.

References Cited
UNITED STATES PATENTS

| | | | |
|---|---|---|---|
| 3,471,388 | 10/1969 | Koral | 260—29.4 UA |
| 3,503,918 | 3/1970 | Le Sota et al. | 260—29.4 UA |
| 3,652,478 | 3/1972 | Ishii et al. | 260—29.4 UA |
| 3,527,721 | 9/1970 | Hönel et al. | 260—29.4 UA |
| 3,594,339 | 7/1971 | Palaika | 260—29.4 UA |

FOREIGN PATENTS

| | | |
|---|---|---|
| 1,131,013 | 6/1972 | Germany. |
| 70/18584 | 6/1970 | Japan. |

LEWIS T. JACOBS, Primary Examiner

S. M. PERSON, Assistant Examiner

U.S. Cl. X.R.

260—41 C